United States Patent Office 3,266,970
Patented August 16, 1966

3,266,970
ADHERING TEXTILE MATERIALS TO RUBBER
Philip T. Paul, Naugatuck, Conn., assignor to United States Rubber Company, New York, N.Y., a corporation of New Jersey
No Drawing. Filed July 10, 1963, Ser. No. 294,180
14 Claims. (Cl. 161—241)

This application is a continuation-in-part of my application Serial No. 234,887, filed November 1, 1962, now abandoned.

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure. In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g. a fusible partially reacted resorcinol-formaldehyde resin, such as a condensate of resorcinol and formaldehyde in the ratio of 1 mole of resorcinol to about 0.5 to 0.8 mole of formaldehyde, and formaldehyde or a formaldehyde-yielding agent which on subsequent heating as during vulcanization of the rubber intermediate the textile plies cures the fusible resin to an infusible state. According to one aspect of the present invention, there is obtained a further improvement in adhesion of the textile material to the rubber intermediate the textile plies in addition to that obtained by the latex "solutioning" treatment of the textile material.

In carrying out the present invention, adhesion of the textile material, which may be bare (so-called grey) or which may be latex "solutioned," to the rubber layers intermediate the textile plies is greatly improved by compounding the solid rubber intermediate the textile plies with a 1-aza-3,7-dioxabicyclo[3.3.0]octane and a condensation product of resorcinol and an alkyl aldehyde having 2 to 4 carbon atoms or benzaldehyde, which react on heating, as in the vulcanization of the rubber, to form a resin. Examples of the alkyl aldehydes are acetaldehyde, propionaldehyde, n-butyraldehyde and isobutyraldehyde. The 1-aza-3,7-dioxabicyclo[3.3.0]octanes that may be used are compounds having the general formula

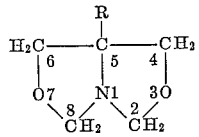

where R is hydrogen or an alkyl radical, or an alkylol radical. These compounds are made in known manner as described in the paper, "Some New Derivatives of Amino Hydroxy Compounds," by Murray Senkus, in Jour. Amer. Chem. Soc. 67, 1515–1519 (1945), by the reaction of two moles of formaldehyde or paraformaldehyde with one mole of the selected 2-amino-1,3-propanediol. Examples of the compounds that may be used are 1-aza-3,7-dioxabicyclo[3.3.0]octane made by reacting 1 mole of 2-amino-1,3-propanediol with 2 moles of paraformaldehyde; 1-aza-5-methyl-3,7-dioxabicyclo[3.3.0]octane made by reacting 1 mole of 2-amino-2-methyl-1,3-propanediol with 2 moles of paraformaldehyde; 1-aza-5-ethyl-3,7-dioxabicyclo[3.3.0]octane made by reacting 1 mole of 2-amino-2-ethyl-1,3-propanediol with 2 moles of paraformaldehyde; 1-aza-5-methylol-3,7-dioxabicyclo[3.3.0]octane made by reacting 1 mole of 2-amino-2-methylol-1,3-propanediol with 2 moles of paraformaldehyde. The compounds are produced in excellent yields by reaction at room temperature. The resorcinol and alkyl aldehyde or benzaldehyde are readily condensed in an easily controlled reaction using an acid such as acetic, oxalic or hydrochloric acid as a catalyst in aqueous or alcohol medium on standing or by heating at temperatures up to reflux. The ratio of the aldehyde to the resorcinol used in the condensation reaction will generally be from one-half to one mole of aldehyde per mole of resorcinol.

The rubber intermediate the textile plies may be applied in the usual manner by calendering a coating of a solid vulcanizable rubber composition containing the 1-aza-3,7-dioxabicyclo[3.3.0]octane and the resorcinol-aldehyde condensation product on the textile material, generally on both sides, e.g. as in the conventional coating of tire cord fabric with tire carcass stock. The resin component of the invention, viz. the 1-aza-3,7-dioxabicyclo[3.3.0]octane and the resorcinol-aldehyde condensate, may be mixed with the conventional compounding ingredients in the solid rubber in a Banbury mixer and the rubber composition then calendered on the textile material. The incorporation of the condensation product of the resorcinol and the aldehyde into the rubber in the Banbury raises no objectionable fuming or dust problem, whereas when resorcinol alone is mixed into the rubber in a Banbury, and the batch is dumped, the resorcinol creates severe and unsightly white fumes which are objectionable in practice. After building the rubber-coated textile material into the finished article, e.g. a tire, the assembly is heated to vulcanize the rubber and react the resin components of the invention. The ratio of the two components of the resin is not critical and generally will be from 0.3 to 2 parts of the 1-aza-3,7-dioxabicyclo[3.3.0]octane per part of the condensation product of the resorcinol and the aldehyde. The amount of the resin components mixed with the rubber is not critical. Generally 0.5 to 8 parts, and preferably 1 to 4 parts, of the two resin forming components (total) per 100 parts of the rubber will be mixed in the rubber compound to be calendered on the textile material. Where the textile material is passed through a rubber latex "solutioning" bath and dried, the deposit on the thus treated textile material will be the range of 2 to 15 percent, preferably 4 to 10 percent, of latex solids based on the weight of the textile material.

The solid rubber used in the present invention for making the rubber and fabric laminates for use in tire manufacture and for other purposes may be natural (Hevea) rubber or conjugated diolefine polymer synthetic rubber or mixtures of any of them including their reclaims. The aqueous dispersion of rubber, when used for "solutioning" the textile material before plying with the solid rubber composition, may be natural rubber latex, or a latex of conjugated diolefine polymer synthetic rubber, or mixtures thereof, or an aqueous dispersion of reclaim from such rubbers, or mixtures of any of such latices and reclaim dispersions. Such conjugated diolefine polymer synthetic rubbers are polymers of butadienes-1,3, e.g. butadiene-1,3, isoprene, 2,3-dimethyl-butadiene-1,3, and copolymers of mixtures thereof, and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons) and synthetic linear polyamides or nylons (e.g. polycaprolactam or nylon 6 and polyhexamethylene-adipamide or nylon 66) and may comprise cords or woven fabrics.

The following examples illustrate the invention. All parts and percentages referred to herein are by weight. Examples 1 to 5 show the preparation of the condensation products of resorcinol and various alkyl aldehydes and benzaldehydes and Example 6 shows the use of reaction products of 1-aza-3,7-dioxabicyclo[3.3.0]octanes and such condensation products for improving the adhesion of rubber to textile material.

*Example 1*

Resorcinol (250 grams, 2.3 moles) and acetaldehyde (50 grams, 1.1 moles) were dissolved in 275 cc. of water and to this solution 5 grams of oxalic acid in 10 cc. of water were added. The solution was refluxed two hours, cooled and about 15 grams of an insoluble material was filtered off and discarded. The filtrate was evaporated under vacuum up to 100° C. A tacky reddish oily condensate of the resorcinol and acetaldehyde was recovered.

*Example 2*

Resorcinol (110 grams, 1 mole), isobutyraldehyde (36 grams, 0.5 mole) and 2.5 grams of oxalic acid in 200 cc. of alcohol were refluxed twenty-four hours during which time the solution gradually darkened. The alcohol and water were removed under vacuum up to 100° C. A tacky reddish oil condensate of the resorcinol and isobutyraldehyde was recovered.

*Example 3*

Resorcinol (110 grams, 1 mole), benzaldehyde (53 grams, 0.5 mole) and 2 grams of oxalic acid were dissolved in 100 cc. of alcohol and the solution refluxed three hours. The solid condensation product of the resorcinol and benzaldehyde that had formed was filtered off, washed with alcohol and dried. It had a melting point above 250° C.

*Example 4*

Resorcinol (110 grams, 1 mole), n-butyraldehyde (36 grams, 0.5 mole) and 2.5 grams of oxalic acid were dissolved in 200 cc. of alcohol. The solution was refluxed eighteen hours. The alcohol and water were removed under vacuum up to 100° C. A tacky reddish oily condensate of resorcinol and n-butyraldehyde was recovered.

*Example 5*

Resorcinol (110 grams, 1 mole), propionaldehyde (30 grams, 0.5 mole) and 2.5 grams of oxalic acid were dissolved in 200 cc. of alcohol. The solution was refluxed twelve hours. The alcohol and water were removed under vacuum up to 100° C. A tacky reddish oily condensate of resorcinol and propionaldehyde was recovered.

*Example 6*

Rayon tire cord was prepared by passing it through a conventional latex "solutioning" bath consisting of 80 parts solids of a latex of a copolymer of 50 parts of butadiene and 50 parts of styrene, 20 parts solids of a latex of a terpolymer of 20 parts of butadiene and 15 parts of vinyl pyridine and 15 parts of styrene, 8 parts of partially reacted resorcinol-formaldehyde resin in the molar ratio of 1 mole of resorcinol and about 0.6 mole of formaldehyde, 0.5 part of ammonia and 2 parts of formaldehyde at 15-20% concentration. Following the "solutioning" treatment the cord was dried.

The adhesion of the rubber to the thus treated cord was determined according to the "H" test as described in India Rubber World, volume 114, page 213 (1946). In this test, the cord coated with the selected rubber compound is embedded in two separate standard rubber blocks and the assembly vulcanized. The pounds necessary to pull the adhered cord free of one of the rubber blocks is the "H" adhesion value. The higher the value, the better the adhesion of the rubber coating to the cord.

The "H" adhesion value was determined with the thus treated rayon cord and a rubber coating compound of the following formulation: 50 parts of natural rubber (smoked sheet), 50 parts of SBR rubber (copolymer of 75 parts of butadiene-1,3 and 25 parts of styrene), 30 parts of whole tire reclaimed rubber of 50% rubber content, 40 parts of carbon black, 1 part of an antioxidant (condensation product of nonylated p-cresol and formaldehyde), 5 parts of zinc oxide, 1.5 parts of stearic acid, 4 parts of pine tar, 4 parts of light mineral oil, 1.1 parts of an accelerator (N - cyclohexyl-2-benzothiazolesulfenamide), and 3.5 parts of sulfur. The "H" adhesion value at 250° F. on this stock cured for 45 minutes at 293° F. was 9.2 lbs. The "H" adhesion values at 250° F. on four rubber stocks of the same formulation but containing in each case 1.25 parts of 1-aza-5-methylol-3,7-dioxabicyclo[3.3.0]octane and also in the first case 1.65 parts of the condensation product of Example 1, in the second case 1.65 parts of the condensation product of Example 2, in the third case 1.65 parts of the condensation product of Example 4, and in the fourth case 1.65 parts of the condensation product of Example 5, cured for 45 minutes at 293° F., were 13.2 lbs., 12.5 lbs., 13.6 lbs. and 12.4 lbs. respectively.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of laminating textile material and rubber by applying a solid vulcanizable rubber composition to a textile material and heating the assembly to vulcanize the rubber, the step which comprises incorporating in the rubber before vulcanization a compound selected from the group consisting of 1-aza-3,7-dioxabicyclo[3.3.0]octane, 1 - aza - 5-methyl - 3,7 - dioxabicyclo[3.3.0]octane, 1-aza-5-ethyl-3,7-dioxabicyclo[3.3.0]octane and 1-aza-5-methylol-3,7-dioxabicyclo[3.3.0]octane, and a condensation product of resorcinol and an aldehyde selected from the group consisting of alkyl aldehydes having 2 to 4 carbon atoms and benzaldehyde.

2. In the method of laminating textile material and rubber by applying a solid vulcanizable rubber composition to a textile material containing the dried deposit of a rubber latex treating bath and heating the assembly to vulcanize the rubber, the step which comprises incorporating in the rubber before vulcanization a compound selected from the group consisting of 1-aza-3,7-dioxabicyclo[3.3.0]octane, 1 - aza - 5 - methyl - 3,7 - dioxabicyclo[3.3.0]octane, 1-aza-5-ethyl-3,7-dioxabicyclo[3.3.0]octane and 1-aza-5-methylol-3,7-dioxabicyclo[3.3.0]octane, and a condensation product of resorcinol and an alkyl aldehyde having 2 to 4 carbon atoms.

3. In the method of laminating textile material and rubber by applying a solid vulcanizable rubber composition to a textile material and heating the assembly to vulcanize the rubber, the step which comprises incorporating in the rubber before vulcanization 1-aza-5-methylol-3,7 - dioxabicyclo[3.3.0]octane and a condensation product of resorcinol and acetaldehyde.

4. A method of adhering textile material to rubber which comprises applying a solid vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing a compound selected from the group consisting of 1 - aza - 3,7 - dioxabicyclo[3.3.0]octane, 1 - aza - 5 - methyl - 3,7 - dioxabicyclo[3.3.0]octane, 1 - aza - 5 - ethyl - 3,7 - dioxabicyclo[3.3.0]octane and 1 - aza - 5 - methylol - 3,7 - dioxabicyclo[3.3.0]octane, and a condensation product of resorcinol and an alkyl aldehyde having 2 to 4 carbon atoms, to a textile material selected from the group consisting of cotton, rayon and nylon to coat the same, and heating the assembly to vulcanize the rubber and to firmly adhere the textile material to the vulcanized rubber composition.

5. A method of adhering textile material to rubber which comprises passing the textile material through a bath of an aqueous dispersion of rubber and drying, applying a solid vulcanizable rubber composition to the thus treated textile material, the rubber in said aqueous dispersion and in said solid rubber composition being selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing a compound selected from the group consisting of 1-aza-3,7-dioxabicyclo[3.3.0]octane, 1 - aza - 5 - methyl-3,7-dioxabicyclo[3.3.0]octane, 1 - aza - 5 - ethyl - 3,7 - dioxabicyclo[3.3.0]octane and 1 - aza - 5 - methylol - 3,7 - dioxabicyclo[3.3.0]octane, and a condensation product of resorcinol and an aldehyde having 2 to 4 carbon atoms to a textile material selected from the group consisting of cotton, rayon and nylon to coat the same, and heating the assembly to vulcanize the rubber and to firmly adhere the textile material to the vulcanized rubber composition.

6. A method of adhering tire cord fabric to a tire carcass stock which comprises calendering on tire cord containing the dried deposit of a rubber latex treating bath a vulcanizable rubber tire carcass stock containing a compound selected from the group consisting of 1-aza-3,7 - dioxabicyclo[3.3.0]octane, 1 - aza - 5 - methyl - 3,7- dioxabicyclo[3.3.0]octane, 1 - aza - 5 - ethyl - 3,7 - dioxabicyclo[3.3.0]octane and 1 - aza - 5 - methylol - 3,7- dioxabicyclo[3.3.0]octane, and a condensation product of resorcinol and an aldehyde having 2 to 4 carbon atoms, and subsequently heating to vulcanize the rubber and to firmly adhere the tire cord fabric to the vulcanized tire carcass stock.

7. A method of adhering tire cord fabric to a tire carcass stock which comprises calendering on tire cord fabric containing the dried deposit of a rubber latex treating bath a vulcanizable tire carcass stock containing 1 - aza - 5 - methylol - 3,7 - dioxabicyclo[3.3.0]octane and a condensation product of resorcinol and acetaldehyde, and subsequently heating to vulcainze the rubber and to firmly adhere the tire cord fabric to the vulcanized tire carcass stock.

8. A laminate of textile material and a calendered vulcanized rubber composition containing the resinous reaction product of a compound selected from the group consisting of 1 - aza - 3,7 - dioxabicyclo[3.3.0]octane, 1 - aza - 5 - methyl - 3,7 - dioxabicyclo[3.3.0]octane, 1 - aza - 5 - ethyl - 3,7 - dioxabicyclo[3.3.0]octane and 1 - aza - 5 - methylol - 3,7 - dioxabicyclo[3.3.0]octane, and a condensation product of resorcinol and an alkyl aldehyde having 2 to 4 carbon atoms.

9. A laminate of textile material and a calendered vulcanized rubber composition containing the resinous reaction product of 1 - aza - 5 - methylol - 3,7 - dioxabicyclo[3.3.0]octane and a condensation product of resorcinol and acetaldehyde.

10. A laminate of tire cord fabric and a vulcanized rubber tire carcass stock containing the resinous reaction product of a compound selected from the group consisting of 1 - aza - 3,7 - dioxabicyclo[3.3.0]octane, 1 - aza - 5- methyl - 3,7 -dioxabicyclo[3.3.0]octane, 1 - aza - 5 - ethyl-3,7 - dioxabicyclo[3.3.0]octane and 1 - aza - 5 - methylol-3,7-dioxabicyclo[3.3.0]octane, and a condensation product of resorcinol and an aldehyde selected from the group consisting of alkyl aldehyde having 2 to 4 carbon atoms and benzaldehyde.

11. A laminate of tire cord fabric containing the dried deposit of a rubber latex treating bath, and a vulcanized rubber tire carcass stock containing the resinous reaction product of a compound selected from the group consisting of 1 - aza - 3,7 - dioxabicyclo[3.3.0]octane, 1 - aza - 5- methyl - 3,7 - dioxabicyclo[3.3.0]octane, 1 - aza - 5 - ethyl-3,7-dioxabicyclo[3.3.0]octane and 1 - aza - 5 - methylol-3,7 - dioxabicyclo[3.3.0]octane, and a condensation product of resorcinol and an alkyl aldehyde having 2 to 4 carbon atoms.

12. A laminate of tire cord fabric containing the dried deposit of a rubber latex treating bath, and a vulcanized rubber tire carcass stock containing the resinous reaction product of 1 aza - 5 - methylol - 3,7 - dioxabicyclo[3.3.0] octane and a condensation product of resorcinol and acetaldehyde.

13. A solid vulcanizable rubber composition containing a compound selected from the group consisting of 1 - aza - 3,7 - dioxabicyclo[3.3.0]octane, 1 - aza - 5- methyl - 3,7 - dioxabicyclo[3.3.0]octane, 1 - aza - 5 - ethyl-3,7 - dioxabicyclo[3.3.0]octane and 1 - aza - 5 - methylol-3,7-dioxabicyclo[3.3.0]octane, and a condensation product of resorcinol and an aldehyde selected from the group consisting of alkyl aldehydes having 2 to 4 carbon atoms and benzaldehyde.

14. A solid vulcanizable rubber composition containing

1 - aza - 5 - methylol - 3,7 - dioxabicyclo[3.3.0]octane and a condensation product of resorcinol and acetaldehyde.

References Cited by the Examiner

UNITED STATES PATENTS

| | | | |
|---|---|---|---|
| 2,363,465 | 11/1944 | Senkus | 260—307.6 |
| 2,448,890 | 9/1948 | Johnston | 260—307 |
| 2,631,961 | 3/1953 | Antheil | 260—845 |
| 2,902,398 | 9/1959 | Schroeder | 156—315 |
| 2,927,051 | 3/1960 | Buckwalter et al. | 161—241 X |
| 2,951,058 | 8/1960 | Updegraff et al. | 260—59 |
| 3,031,431 | 4/1962 | Rye | 260—43 |
| 3,193,407 | 7/1965 | Keller et al. | 252—8.8 |
| 3,194,294 | 7/1965 | van Gils | 152—357 |

FOREIGN PATENTS 715,618  9/1954  Great Britain.

EARL M. BERGERT, *Primary Examiner.*

C. B. COSBY, *Assistant Examiner.*